Patented Jan. 31, 1928.

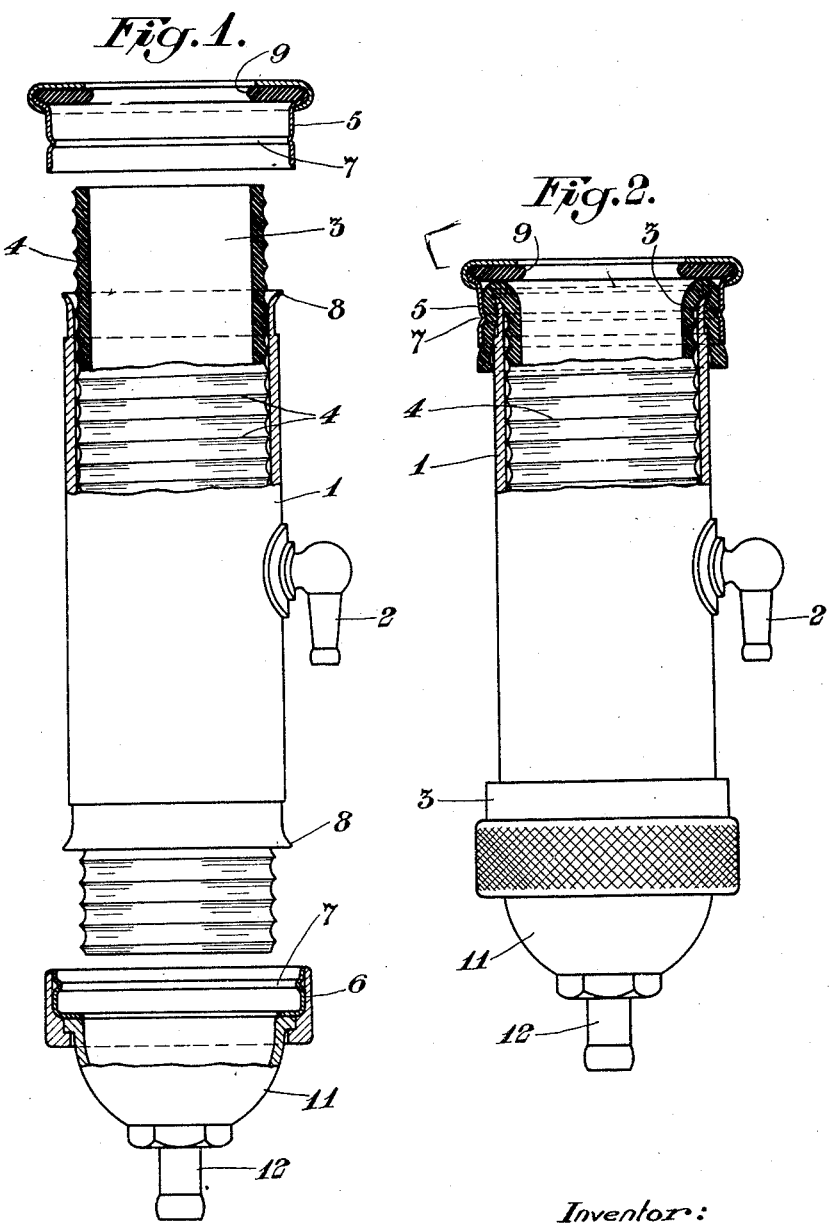

1,657,667

UNITED STATES PATENT OFFICE.

CARL ELIS ELLISON, OF NORRKOPING, SWEDEN, ASSIGNOR TO AKTIEBOLAGET MANUS, OF NORRKOPING, SWEDEN, A COMPANY OF SWEDEN.

TEAT CUP.

Application filed April 8, 1926, Serial No. 100,510, and in Sweden April 23, 1925.

The present invention relates to an improvement in teat cups for milking machines of the kind which comprise a teat cup tube of a stiff material, for instance metal, and a lining sleeve, of rubber or other elastic material, placed in said tube and secured to the same by each end of the lining sleeve being folded over the adjacent end of the tube, the folded ends of said lining sleeve being suitably retained by means of rings pushed over said folds.

The present improvement consists in that the said lining sleeve is provided on its outside along its entire length with ribs or the like extending substantially circumferentially or transversely to the longitudinal direction of the sleeve. The said ribs serve to retain the folded ends of the lining sleeve in correct positions, and they also prevent the lining sleeve from being forced tightly against the nozzle opening in the tube during the alternate suction and pressure set up between the sleeve and the tube during the operation of the milking machine.

An embodiment of a teat cup according to the invention is illustrated by way of example in the accompanying drawing, in which Fig. 1 shows the teat cup disassembled and partly in section, and Fig. 2 shows the teat cup assembled, also partly in section.

In the drawing, 1 denotes the teat cup tube, which may be made, for instance, of metal and has smooth interior and exterior surfaces. Said tube is provided on one side with a nozzle 2 which serves to connect the teat cup with the usual pulsator, which latter is not illustrated. A lining sleeve 3 of rubber is inserted in the tube 1, said sleeve being provided on the outside with ribs 4 extending transversely to the longitudinal direction of the sleeve. The interior surface of the lining is smooth. The lining sleeve has a somewhat greater length than the tube 1, as shown in Fig. 1, and said sleeve may be secured to said tube by folding the ends of the sleeve which extend beyond the ends of the tube 1 in Fig. 1, over said ends of the tube, as shown in Fig. 2, after which rings 5 and 6 made for instance of pressed sheet metal, are pushed over the folded portions of the sleeve. Each such ring is provided on its inner side with a circumferential ridge 7 which, when the ring has been pushed on, forces the folded portion of the elastic sleeve against the outside of the tube 1 and thus holds said sleeve to said tube. In order to further secure the sleeve 3 to the tube 1 the latter is preferably slightly widened or expanded at both ends, as shown at 8. These expanded edges cooperate with the ridges 7, which latter are so located that when the rings 5 and 6 have been pushed on, said ridges occupy a position just inside the expanded edges, as shown in Fig. 2, to still more securely retain the pushed-on rings in position. The transverse ribs 4 on the outside of the lining sleeve also help to retain the folded portion of the sleeve in correct position. The said ribs also provide the advantage that the lining sleeve 3 is prevented from closing tightly over the opening of the nozzle 2 in the tube 1.

A rubber ring 9 is inserted in the upper ring 5 in order to protect the teat from being hurt by the inner edge of the ring 5. The lower ring 6 also serves to carry the bottom cup 11 which is provided in the usual manner with a nozzle 12 to be connected to the milk conduit.

Owing to the arrangement above described it is very easy to take the teat cup apart for the purpose of cleaning the same. It is merely required to pull off the rings 5 and 6, after which the sleeve 3 may easily be pulled out of the tube 1. It will also be obvious that the arrangement renders it easy to stretch the rubber sleeve when such stretching is necessary owing to the sleeve having lost some of its elasticity after being used for some time.

I claim:

1. In a teat cup, the combination of a tube, and an elastic lining sleeve in said tube provided on its outside with circumferential ribs along its entire length and secured at both ends to said tube by each end of said lining sleeve being folded over the adjacent end of said tube.

2. In a teat cup, the combination of a tube, an elastic lining sleeve in said tube, provided on its outside with circumferential ribs along its entire length, said sleeve having its ends folded over the ends of said tube, and rings placed over the folded ends of said sleeve.

CARL ELIS ELLISON.